United States Patent [19]

Kawakami et al.

[11] Patent Number: 5,094,904
[45] Date of Patent: Mar. 10, 1992

[54] MAGNETIC RECORDING MEDIUM

[75] Inventors: Akira Kawakami; Yasuo Ando; Takuo Nishikawa; Rieko Ren; Miki Edamatsu, all of Hino, Japan

[73] Assignee: Konica Corporation, Tokyo, Japan

[21] Appl. No.: 673,970

[22] Filed: Mar. 22, 1991

[30] Foreign Application Priority Data

Mar. 27, 1990 [JP] Japan ................................. 2-77214

[51] Int. Cl.$^5$ .............................................. G11B 23/00
[52] U.S. Cl. ................................... 428/212; 428/329; 428/336; 428/694; 428/900
[58] Field of Search ................ 428/336, 694, 900, 329

[56] References Cited

U.S. PATENT DOCUMENTS

| 4,323,621 | 4/1982 | Kober et al. | 428/900 |
| 4,784,895 | 11/1988 | Mizuno et al. | 428/694 |
| 4,851,287 | 7/1989 | Ogawa et al. | 428/900 |
| 4,992,330 | 2/1991 | Kawahara et al. | 428/900 |

Primary Examiner—Paul J. Thibodeau
Attorney, Agent, or Firm—Jordan B. Bierman

[57] ABSTRACT

Disclosed is a magnetic recording medium comprising a non-magnetic support, and a first magnetic layer, a second magnetic layer and a third magnetic layer laminated on a non-magnetic support surface in this order, a total layer thickness of the second magnetic layer and the third magnetic layer of 0.7 μm or less, and a coercive force of a ferromagnetic powder contained in the third magnetic layer being 1.2 to 2.5 times as strong as a coercive force of a ferromagnetic powder contained in the first magnetic layer.

6 Claims, No Drawings

MAGNETIC RECORDING MEDIUM

BACKGROUND OF THE INVENTION

This invention relates to a magnetic recording medium, more specifically to a magnetic recording medium excellent in electromagnetic transducing properties.

In the prior art, recording magnetic media such as a magnetic tape have been prepared by coating a magnetic coating comprising a ferromagnetic powder, a binder resin, a solvent and others on a non-magnetic support surface and drying the coated support.

However, in this kind of a magnetic recording medium, while the magnetic layer thus formed on the non-magnetic support is a single layer, it is necessary to cover a wide frequency band region from a low region to a high region by one kind of a magnetic powder.

Particularly, in the tendency of high density recording in recent years, it has been demanded to improve recording properties at a high region and also to lower noises so that a magnetic powder having high Hc and high BET values has been employed.

However, in a magnetic layer comprising a single layer, there involves the problem that frequency characteristics at a low region become insufficient.

For solving such a problem, in a magnetic recording medium such as a magnetic recording medium for video, there has been proposed magnetic recording media having plural magnetic layers in order to heighten a magnetic recording capacity, or to improve magnetic recording properties both at a high frequency region and at a low frequency region of a magnetic recording medium whereby balancing frequency characteristics at a low region and at a high region (see Japanese Unexamined Patent Publications No. 98803/1973 and No. 172142/1984, Japanese Patent Publication No. 2218/1957, Japanese Unexamined Patent Publications No. 56228/1976 and No. 146211/1988).

According to these known techniques, a magnetic recording medium is so designed that an upper layer and a lower layer of a magnetic layer have different functions, and that video output is conducted in the upper layer and chroma and audio outputs are conducted in the lower layer.

However, in such a conventional magnetic recording medium having magnetic layers with different functions, a surface roughness degree of a non-magnetic support exerts great influence on a magnetic layer, whereby electromagnetic transducing properties of magnetic layers having different properties are worsened.

For improving properties at a frequency region, particularly at a low frequency region, there is a technique in which ferromagnetic powder having a large particle size is added to a magnetic layer. However, in this technique, there involves the problem that dispersibility of a ferromagnetic powder is worsened and also dropping-out of a powder (drop out) is liable to occur.

SUMMARY OF THE INVENTION

The present invention has been accomplished in view of the above situation.

An object of the present invention is to provide a magnetic recording medium basically comprising a three layer structure magnetic layers each of which has a function different from each other, also having good properties at a low frequency region even in such a magnetic layer, and yet excellent in electromagnetic transducing properties and small in drop out.

The present invention for accomplishing the above object comprises a magnetic recording medium characterized in that a first magnetic layer, a second magnetic layer and a third magnetic layer are laminated in this order on a non-magnetic support surface, a total layer thickness of the second magnetic layer and the third magnetic layer is 0.7 μm or less, and a coercive force (Hc) of a ferromagnetic powder contained in the third magnetic layer is 1.2 to 2.5 times as strong as that of a ferromagnetic powder contained in the first magnetic layer.

DESCRIPTION OF THE PREFERRED EMBODIMENTS

In the following, the present invention is described in more detail.

LAYER CONSTITUTION

The magnetic recording medium of the present invention comprises basically a first magnetic layer, a second magnetic layer and a third magnetic layer laminated or provided in this order on a non-magnetic support surface.

On a surface of the non-magnetic support on which the above respective magnetic layers are not provided (a back surface), a back coat layer may be provided for the purpose of improving running property, preventing static charge and preventing transfer of the magnetic recording medium. Also, between the above first magnetic layer and the non-magnetic support, an intermediate layer such as an adhesive layer may be provided.

The above respective magnetic layers comprise at least a ferromagnetic powder dispersed in a binder resin.

In the present invention, it is important that the second magnetic layer and the third magnetic layer are laminated thinly on the first magnetic layer so that a total layer thickness of the two layers becomes 0.7 μm or less, preferably 0.7 to 0.2 μm.

As far as this condition regarding the layer thickness and a condition regarding coercive force described below are satisfied, the object of the present invention can be accomplished.

If the above total layer thickness exceeds 0.7 μm, output at a low region is lowered undesirably.

The thickness of the first magnetic layer is not particularly limited, but in general, it may be suitably about 0.5 to 4 μm.

FERROMAGNETIC POWDER

As the ferromagnetic powder to be used in the present invention, there may be mentioned, for example, fine ferromagnetic metal powders such as Co-containing γ-$Fe_2O_3$ powder, Co-containing $Fe_3O_4$ powder, Co-containing $FeO_x$ (4/3 < X < 3/2) powder, Fe—Al metal powder, Fe—Ni metal powder, Fe—Al—Ni metal powder, Fe—Al—P metal powder, Fe—Ni—Si—Al metal powder, Fe—Ni—Si—Al—Mn metal powder, Ni—Co metal powder, Fe—Mn—Zn metal powder, Fe—Ni—Zn metal powder, Fe—Co—Ni—Cr metal powder, Fe—Co—Ni—P metal powder, Co—Ni metal powder, Co—P metal powder, etc.

Among these, preferred is fine Co-containing γ-$Fe_2O_3$ powder.

These ferromagnetic powders can be used singly or in combination of two or more kinds.

The ferromagnetic powder to be used in the present invention has generally a BET value of 35 m²/g or more, preferably 40 to 80 m²/g and a coercive force of 500 to 2000 Oe. The coercive forces of the ferromagnetic powders contained in the first and the second magnetic layers are preferably 500 Oe or more and that contained in the third magnetic layer is those satisfying the value defined above.

Such a ferromagnetic powder has large saturation magnetization and coercive force, and is excellent in high density recording.

When a ferromagnetic powder having a large specific surface area (e.g. 40 m²/g or more) is used, a medium which enables high density recording and is excellent in S/N ratio, etc., can be easily obtained.

The shape of the above ferromagnetic powder is not particularly limited as long as it is fine, and, for example, any of needle-shaped, sphere-shaped or ellipsoid-shaped powder can be used.

On the other hand, in the present invention, it is important that the coercive force of the ferromagnetic powder to be contained in the above third magnetic layer is 1.2 to 2.5 times as strong as the coercive force of the ferromagnetic powder to be contained in the above first magnetic layer.

If the above coercive force is less than 1.2 times, video output and color output are not balanced undesirably, and on the other hand, if it exceeds 2.5 times, S/N ratio of chroma signals is deteriorated undesirably.

Thus, only when the above condition regarding the coercive force and the condition regarding the layer thickness previously mentioned are satisfied at the same time, the object of the present invention can be accomplished.

BINDER RESIN

In the present invention, as a binder resin to be contained in the respective magnetic layers, there may be preferably used a resin modified by introducing a functional group, particularly a modified vinyl chloride resin, a modified polyurethane type resin and a modified polyester resin.

As the above functional group, there may be preferably mentioned,
for example,

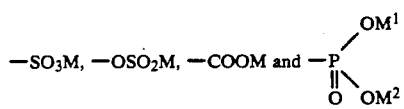

wherein M represents a hydrogen atom or an alkali metal such as lithium and sodium; and M¹ and M² each represent a hydrogen atom, lithium, potassium, sodium or an alkyl group; and M¹ and M² may be the same or different.

When the modified resin contains such a functional group, not only the modified resin and the ferromagnetic powder are mixed well and dispersibility of the ferromagnetic powder is further improved, but also its agglomeration is prevented. Accordingly, stability of a coating solution is much improved, and therefore frequency characteristics from at a high region to at a low region is improved with good balance and durability of the magnetic recording medium is also improved in addition to electromagnetic transducing properties.

The above modified resins can be used singly or in combination of two or more kinds.

The above modified resins can be prepared by condensing a vinyl chloride type resin, a polyurethane resin or a polyester resin and a compound having a negative-functional group and chlorine in a molecule, for example,

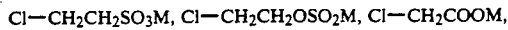

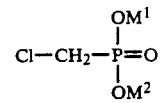

according to dehydrochlorination reaction.

Further, in the present invention, a thermoplastic resin, a thermosetting resin, a reactive type resin and an electron beam radiation curing type resin which have been known in the field of magnetic recording media, or a mixture thereof can be used, or these resins can be used in combination with the above modified resin.

As the above thermoplastic resin, there may be mentioned, for example, vinyl chloride-vinyl acetate copolymer, vinyl chloride-vinylidene chloride copolymer, vinyl chloride-acrylonitrile copolymer, acrylate-acrylonitrile copolymer, acrylate-vinylidene chloride copolymer, methacrylate-vinylidene chloride copolymer, methacrylate-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, nitrocellulose, etc.), styrenebutadiene copolymer, polyester resin, chlorovinyl etheracrylate copolymer, amino resin, synthetic rubber type thermoplastic resin, etc.

These resins may be used singly or in combination of two or more kinds.

As the above thermosetting resin or reactive type resin, there may be mentioned, for example, phenol resin, epoxy resin, polyurethane curing type resin, urea resin, melamine resin, alkyd resin, silicone resin, acryl type reactive resin, a mixture of high molecular weight polyester resin and isocyanate prepolymer, a mixture of methacrylate copolymer and diisocyanate prepolymer, urea-formaldehyde resin, polyamine resin, etc.

These resins may be used singly or in combination of two or more kinds.

As the above electron beam radiation curing type resin, there may be mentioned, for example, unsaturated prepolymers such as maleic anhydride type, urethane-acryl type, epoxy-acryl type, polyester-acryl type, polyether-acryl type, polyurethane-acryl type, polyamide-acryl type, etc., and polyfunctional monomers such as ether-acryl type, urethane-acryl type, epoxy-acryl type, phosphate-acryl type, aryl type, hydrocarbon type, etc.

These resins may be used singly or in combination or two or more kinds.

The amount of the above binder resin to be formulated in the magnetic layer is generally 1 to 200 parts by weight, preferably 1 to 50 parts by weight per 100 parts by weight of the above ferromagnetic powder.

If the amount of the binder resin to be formulated is too large, the amount of the ferromagnetic powder to be formulated becomes small as the result, whereby recording density of the magnetic recording medium may be lowered, while the amount to be formulated is too small, strength of the magnetic layer is lowered, whereby running durability of the magnetic recording medium may be lowered.

In the present invention, as a hardener, aromatic or aliphatic polyisocyanate can be used in combination with the above binder resin.

The aromatic polyisocyanate may include, for example, tolylene diisocyanate (TDI), an adduct of TDI and an active hydrogen compound, etc., and may preferably have an average molecular weight in the range of 100 to 3,000.

The aliphatic polyisocyanate may include, for example, hexamethylene diisocyanate (HMDI), an adduct of HMDI and an active hydrogen compound, etc., and may preferably have an average molecular weight in the range of 100 to 3,000. Further, non-alicyclic polyisocyanate and an adduct of nonalicyclic polyisocyanate and an active hydrogen compound are preferred.

The amount of the above aromatic or aliphatic polyisocyanate to be added is generally 1/20 to 7/10, preferably 1/10 to ½ in terms of a weight ration based on the above binder resin.

OTHER COMPONENTS

In the magnetic recording medium of the present invention, in the respective magnetic layers, various additive components such as lubricant, non-magnetic abrasive particle, conductive powder and surfactant may be contained, if necessary.

As the above lubricant, there may be mentioned, for example, silicone oil, graphite, molybdenum disulfide, aliphatic acid ester comprising monobasic aliphatic acid having about 12 to 20 carbon atoms (e.g. stearic acid) and a monovalent alcohol having about 3 to 26 carbon atoms, etc.

As the above non-magnetic abrasive particle, there can be mentioned, for example, alumina ($\alpha$-Al$_2$O$_3$ (corundum)), artificial corundum, molten alumina, silicon carbide, chromium oxide, diamond, artificial diamond, garnet, emery (main component: corundum and magnetite), etc. The amount of this abrasive particle to be contained may be preferably 20 parts by weight or less based on the ferromagnetic powder, and may preferably have an average particle size of 0.5 $\mu$m or less, more preferably 0.4 $\mu$m or less.

Particularly when the above lubricant and non-magnetic abrasive particle are contained in the third magnetic layer, contact characteristics with a head (slide running property and abrasion property) can be improved significantly.

As the above conductive powder, there may be mentioned, for example, carbon black, graphite, silver powder, nickel powder, etc. As the above surfactant, there may be mentioned natural, nonionic, anionic, cationic and amphoteric surfactants.

By suitably incorporating these conductive powders and surfactants particularly into the third magnetic layer, surface electric resistance can be lowered effectively, and generation of noises due to discharge of static electric charge and generation of drop out due to attachment of dust can be prevented.

NON-MAGNETIC SUPPORT

As a material for forming the above non-magnetic support, there may be mentioned, for example, polyesters such as polyethylene terephthalate, polyethylene-2,6-naphthalate, etc.; polyolefins such as polypropylene; cellulose derivatives such as cellulose triacetate, cellulose diacetate, etc.; plastics such as polyamide, polycarbonate, etc.; metals such as Cu, Al, Zn, etc.; glasses, boron nitride, Si carbide, ceramics, etc.

The shape of the above non-magnetic support is not particularly limited, and it may be mainly tape-shaped, film-shaped, sheet-shaped, card-shaped, disc-shaped, drum-shaped, etc.

The thickness of the above-non-magnetic support is not particularly limited, but, for example, in the case of the film-shaped and sheet-shaped supports, it may be generally 3 to 100 $\mu$m, preferably 5 to 50 $\mu$m, in the case of the disc-shaped and card-shaped supports, it may be preferably about 30 $\mu$m to 10 mm, and in the case of the drum-shaped support, it may be selected suitably depending on a recorder and others.

This non-magnetic support may comprise a single layer structure or a multilayer structure.

Further, this non-magnetic support may be a support which has been subjected to surface treatment such as corona discharge treatment.

PREPARATION OF MAGNETIC RECORDING MEDIUM

The method for preparing the magnetic recording medium of the present invention is not particularly limited. The magnetic recording medium can be prepared according to a known method which is employed for preparing a magnetic recording medium having a multilayer structure, or can be prepared according to other various methods.

For example, in general, components for forming a magnetic layer such as a ferromagnetic powder, a binder resin and the like are kneaded and dispersed in a solvent to prepare a magnetic coating, and then the magnetic coating is coated on a non-magnetic support surface.

As the above solvent, there may be used, for example, ketones such as acetone, methyl ethyl ketone (MEK), methyl isobutyl ketone (MIBK), cyclohexanone, etc.; alcohols such as methanol, ethanol, propanol, etc.; esters such as methyl acetate, ethyl acetate, butyl acetate, propyl acetate, ethyl lactate, ethylene glycol monoacetate, etc.; ethers such as diethylene glycol dimethyl ether, 2-ethoxyethanol, tetrahydrofuran, dioxane, etc.; aromatic hydrocarbons such as benzene, toluene, xylene, etc.; and halogenated hydrocarbons such as methylene chloride, ethylene chloride, carbon tetrachloride, chloroform, ethylene chlorohydrin, dichlorobenzene, etc.

For preparing the magnetic coating, the above ferromagnetic powder and other components for forming a magnetic layer are simultaneously or separately thrown into a kneader.

For example, the above ferromagnetic powder was added in a solution containing a dispersing agent, and after the mixture was kneaded for a predetermined time, the respective remaining components were added, and kneading was continued to prepare a magnetic coating.

For kneading and dispersing the components for forming a magnetic layer, various kneaders can be used.

As this kneader, there may be mentioned, for example, twin roll mill, triple roll mill, ball mill, pebble mill, side grinder, Sqegvari attritor, high speed impeller dispersing machine, high speed stone mill, high speed impact mill, disperse kneader, high speed mixer, homogenizer, ultrasonic dispersing machine, etc.

As a coating system, there may be mentioned, for example, wet-on-wet system, wet-on-dry system, dry-on-wet system, dry-on-dry system, etc. Among these systems, wet-on-wet system and wet-on-dry system are preferred, and wet-on-wet system is particularly preferred.

The wet-on-wet system has an advantage that productivity is excellent and an upper layer can be easily made into a thin film as compared with the other coating systems.

As a method for coating the magnetic coating, there may be included, for example, gravure coating method, knife coating method, wire bar coating method, doctor blade coating method, reverse roll coating method, dip coating method, air knife coating method, calendar coating method, squeeze coating method, kiss coating method, fountain coating method, etc.

After the magnetic coating is coated on a non-magnetic support surface, a coated film in an undried condition is generally subjected to an orientating treatment in a magnetic field, and further to a surface smoothing treatment by using a super calendar roll, and then the support was cut into a desired shape to obtain a magnetic recording medium.

In the magnetic recording medium of the present invention, characteristics at a low frequency region (color signals) are improved, drop out is also inhibited, and electromagnetic transducing properties including strengths of recording and output signals and S/N ratio are excellent.

EXAMPLES

The present invention is described in detail by referring to Examples and Comparative examples.

The present invention is not limited by the following Examples.

EXAMPLE 1

The respective components shown below were kneaded and dispersed sufficiently by using a kneader and a ball mill, and then 5 parts by weight (hereinafter abbreviated as "parts") of a polyisocyanate compound Colonate L (trade name, manufactured by Nippon Polyurethane K.K.) was added and mixed immediately before coating to prepare Magnetic coatings A, B and C.

| Magnetic coating A: | |
| --- | --- |
| Co-$\gamma$-Fe$_2$O$_3$ (Hc: 700 Oe, BET value: 37 m$^2$/g) | 100 parts |
| Sulfo-modified vinyl chloride type resin MR110 (trade name, manufactured by Nippon Zeon K.K.) | 7 parts |
| Polyurethane resin, Takelak E551 (trade name, manufactured by Takeda Yakuhin Kogyo K.K.) | 10 parts |
| $\alpha$-Alumina | 1 part |
| Myristic acid | 2 parts |
| Butyl stearate | 1 part |
| Cyclohexanone | 120 parts |
| Toluene | 60 parts |
| Methyl ethyl ketone | 100 parts |
| Magnetic coating B: | |
| Co-$\gamma$-Fe$_2$O$_3$ (Hc: 800 Oe, BET value: 45 m$^2$/g) | 100 parts |
| Sulfo-modified vinyl chloride type resin MR110 (trade name, manufactured by Nippon Zeon K.K.) | 5 parts |
| Polyurethane resin, Takelak E620 | 12 parts |
| (trade name, manufactured by Takeda Yakuhin Kogyo K.K.) | |
| $\alpha$-Alumina | 1 part |
| Myristic acid | 1 part |
| Butyl stearate | 2 parts |
| Cyclohexanone | 120 parts |
| Toluene | 60 parts |
| Methyl ethyl ketone | 100 parts |
| Magnetic coating C: | |
| Co-$\gamma$-Fe$_2$O$_3$ (Hc: 980 Oe, BET value: 55 m$^2$/g) | 100 parts |
| Sulfo-modified vinyl chloride type resin MR110 (trade name, manufactured by Nippon Zeon K.K.) | 10 parts |
| Polyurethane resin, Takelak E620 (trade name, manufactured by Takeda Yakuhin Kogyo K.K.) | 8 parts |
| $\alpha$-Alumina | 4 parts |
| Myristic acid | 1 part |
| Butyl stearate | 2 parts |
| Cyclohexanone | 80 parts |
| Toluene | 80 parts |
| Methyl ethyl ketone | 140 parts |

Next, on a polyethylene terephthalate base film having a thickness of 13 $\mu$m, by using a coater of an extrusion system, Magnetic coating A, Magnetic coating B and Magnetic coating C described above were coated successively according to the wet-on-wet system, and dried, followed by calendar treatment, to form a first magnetic layer having a film thickness of 2.5 $\mu$m, a second magnetic layer having a film thickness of 0.3 $\mu$m and a third magnetic layer having a film thickness of 0.2 $\mu$m.

Thereafter, the polyethylene terephthalate film on which these magnetic layers were formed was slit into a strip having a width of ½ inch to prepare a sample tape.

The characteristics of this sample tape were measured according to the following manner.

The results are shown in Table 1.

(a) Measurement of C-out and S/N

By using HR-S7000 (trade name, manufactured by Nihon Victor K.K.), 6.0 MHz was recorded with a maximum recording current, and a noise voltage at the time of reproduction was measured to determine C-out and S/N.

(b) Drop out

By using Shibasoku VH01BZ (trade name, manufactured by Shibasoku K.K.), numbers of drop out at 15 $\mu$sec/min at the starting point and after running of 200 passes were measured.

(c) RF-OUT

By using a noise meter manufactured by Shibasoku K.K., output at the time of reproduction at 100 % white signal was measured in comparison with a standard tape.

EXAMPLE 2

A sample tape was prepared in the same manner as in Example 1 except for using a Co-$\gamma$-Fe$_2$O$_3$ powder having Hc of 500 Oe as a ferromagnetic powder in Magnetic coating A, using a Co-$\gamma$-Fe$_2$O$_3$ powder having Hc of 1200 Oe as a ferromagnetic powder in Magnetic coating C, and making film thicknesses of the second magnetic layer and the third magnetic layer after calendar treatment 0.2 $\mu$m, respectively, and its characteristics were measured.

The results are shown in Table 1.

EXAMPLE 3

A sample tape was prepared in the same manner as in Example 1 except for using a Co-γ-Fe₂O₃ powder having Hc of 700 Oe as a ferromagnetic powder in Magnetic coating A, using a Co-γ-Fe₂O₃ powder having Hc of 980 Oe as a ferromagnetic powder in Magnetic coating C, and making film thicknesses of the second magnetic layer and the third magnetic layer after calendar treatment 0.2 $\mu$m and 0.4 $\mu$m, respectively, and its characteristics were measured.

The results are shown in Table 1.

EXAMPLE 4

A sample tape was prepared in the same manner as in Example 1 except for using a Co-γ-Fe₂O₃ powder having Hc of 700 Oe as a ferromagnetic powder in Magnetic coating A, using a Co-γ-Fe₂O₃ powder having Hc of 980 Oe as a ferromagnetic powder in Magnetic coating C, and making film thicknesses of the second magnetic layer and the third magnetic layer after calendar treatment 0.4 $\mu$m and 0.2 $\mu$m, respectively, and its characteristics were measured.

The results are shown in Table 1.

EXAMPLE 5

A sample tape was prepared in the same manner as in Example 1 except for using a Co-γ-Fe₂O₃ powder having Hc of 840 Oe as a ferromagnetic powder in Magnetic coating C, and its characteristics were measured.

The results are shown in Table 1.

COMPARATIVE EXAMPLE 1

A sample tape was prepared in the same manner as in Example 1 except for using a Co-γ-Fe₂O₃ powder having Hc of 700 Oe as a ferromagnetic powder in Magnetic coating A, using a Co-γ-Fe₂O₃ powder having Hc of 980 Oe as a ferromagnetic powder in Magnetic coating C, and making film thicknesses of the second magnetic layer and the third magnetic layer after calendar treatment 0.3 $\mu$m and 0.5 $\mu$m, respectively, and its characteristics were measured.

The results are shown in Table 1.

COMPARATIVE EXAMPLE 2

A sample tape was prepared in the same manner as in Example 1 except for using a Co-γ-Fe₂O₃ powder having Hc of 800 Oe as a ferromagnetic powder in Magnetic coating A, using a Co-γ-Fe₂O₃ powder having Hc of 880 Oe as a ferromagnetic powder in Magnetic coating C, and making film thicknesses of the second magnetic layer and the third magnetic layer after calendar treatment 0.2 $\mu$m and 0.3 $\mu$m, respectively, and its characteristics were measured.

The results are shown in Table 1.

COMPARATIVE EXAMPLE 3

A sample tape was prepared in the same manner as in Example 1 except for using a Co-γ-Fe₂O₃ powder having Hc of 500 Oe as a ferromagnetic powder in Magnetic coating A, using a an iron-Ni type alloy powder having Hc of 1300 Oe as a ferromagnetic powder in Magnetic coating C, and making film thicknesses of the second magnetic layer and the third magnetic layer after calendar treatment 0.2 $\mu$m and 0.3 $\mu$m, respectively, and its characteristics were measured.

The results are shown in Table 1.

TABLE 1

| | Total layer thickness of second magnetic layer and third magnetic layer | (Hc of ferromagetic powder in the third magnetic layer)/(Hc of ferromagnetic powder in the first magnetic layer) | C-OUT | S/N | Drop out | RF-OUT |
|---|---|---|---|---|---|---|
| Example 1 | 0.5 | 1.4 | +1.5 | +0.5 | 2 | +1.5 |
| Example 2 | 0.4 | 2.4 | +1.0 | +0.5 | 1 | +2.0 |
| Example 3 | 0.6 | 1.4 | +1.4 | +1.0 | 3 | +1.5 |
| Example 4 | 0.6 | 1.4 | +1.0 | +0.5 | 1 | +1.0 |
| Example 5 | 0.5 | 1.2 | +1.0 | +0.5 | 6 | +1.0 |
| Comparative example 1 | 0.8 | 1.4 | 0 | +1.0 | 20 | +1.0 |
| Comparative example 2 | 0.5 | 1.1 | +1.0 | −0.5 | 15 | −1.5 |
| Comparative example 3 | 0.5 | 2.6 | −1.0 | −2.0 | 23 | +1.0 |

In the magnetic recording medium of the present invention, characteristics at a low frequency region (color signals) are improved significantly, drop out is also inhibited, and electromagnetic transducing properties including strengths of recording and output signals, S/N ratio and others are excellent.

We claim:

1. A magnetic recording medium comprising a magnetic support, having laminated thereon, in order, a first magnetic layer, a second magnetic layer, and a third magnetic layer, each said magnetic layer comprising a ferromagnetic powder and a binder resin, a thickness of said first magnetic layer being 0.5 to 4.0 $\mu$m, a combined layer thickness of said second magnetic layer and said third magnetic layer being 0.7 $\mu$m or less, a coercive force of a ferromagnetic powder contained in said third magnetic layer being 1.2 to 2.5 times that of a ferromagnetic powder contained in said first magnetic layer, said binder resin being a resin modified by introducing a functional group to a resin selected from the group consisting of vinyl chloride, polyurethane, and polyester, said functional group being at least one selected from the group consisting of

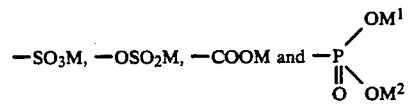

wherein M represents a hydrogen atom or an alkali metal; and M¹ and M² may be the same or different and each represent a hydrogen atom, lithium, potassium, sodium or an alkyl group, said binder being present in each said first, second and third magnetic layer in an amount of 1 to 200 parts by weight based on 100 parts by weight of said ferromagnetic powder.

2. The medium of claim 1 wherein each of said magnetic layers comprises a ferromagnetic powder, a binder resin and a curing agent, and optionally at least one selected from the group consisting of lubricant, non-magnetic abrasive particle, conductive powder and surfactant.

3. The medium of claim 2 wherein said ferromagnetic powder has a BET value of 35 m²/g or more.

4. The medium of claim 3 wherein said ferromagnetic powder has a BET value of 40 to 80 m²/g.

5. The medium of claim 3 wherein said ferromagnetic powder is at least one selected from the group consisting of Co-containing $\gamma$-$Fe_2O_3$ powder, Co-containing $Fe_3O_4$ powder, Co-containing $FeO_x$ (where $4/3 < X < 3/2$) powder, Fe—Al metal powder, Fe—Ni metal powder, Fe—Al—Ni metal powder, Fe—Al—P metal powder, Fe—Ni—Si—Al metal powder, Fe—Ni—Si—Al—Mn metal powder, Ni—Co metal powder, Fe—Mn—Zn metal powder, Fe—Ni—Zn metal powder, Fe—Co—Ni—Cr metal powder, Fe—Co—Ni—P metal powder, Co—Ni metal powder and Co—P metal powder.

6. The medium of claim 2 wherein said curing agent is an aromatic polyisocyanate or an aliphatic polyisocyanate.

* * * * *